United States Patent
Hsu et al.

(10) Patent No.: US 10,408,932 B2
(45) Date of Patent: Sep. 10, 2019

(54) ENVIRONMENT RECOGNITION SYSTEM USING VEHICULAR MILLIMETER WAVE RADAR

(71) Applicant: AUTOMOTIVE RESEARCH & TESTING CENTER, Changhua County (TW)

(72) Inventors: Ping-Min Hsu, Changhua County (TW); Tzu-Sung Wu, Changhua County (TW)

(73) Assignee: Automotive Research & Testing Center, Lugang, Changhua County (TW)

( * ) Notice: Subject to any disclaimer, the term of this patent is extended or adjusted under 35 U.S.C. 154(b) by 355 days.

(21) Appl. No.: 15/382,006

(22) Filed: Dec. 16, 2016

(65) Prior Publication Data

US 2018/0172825 A1    Jun. 21, 2018

(51) Int. Cl.
| | |
|---|---|
| *G01S 13/89* | (2006.01) |
| *G01S 13/93* | (2006.01) |
| *G01S 7/41* | (2006.01) |
| *G01S 13/72* | (2006.01) |

(52) U.S. Cl.
CPC ............ *G01S 13/931* (2013.01); *G01S 7/411* (2013.01); *G01S 7/414* (2013.01); *G01S 13/726* (2013.01)

(58) Field of Classification Search
CPC ...... G01S 13/726; G01S 13/931; G01S 7/411; G01S 7/414
USPC .......................................................... 342/70
See application file for complete search history.

(56) References Cited

U.S. PATENT DOCUMENTS

| | | | |
|---|---|---|---|
| 6,956,469 B2 | 10/2005 | Hirvonen et al. | |
| 2013/0088380 A1* | 4/2013 | Isoda | G01S 7/285 |
| | | | 342/109 |
| 2014/0062685 A1 | 3/2014 | Tamatsu et al. | |
| 2014/0333467 A1 | 11/2014 | Inomata | |

FOREIGN PATENT DOCUMENTS

| | | |
|---|---|---|
| CN | 102508246 B | 4/2013 |
| CN | 104024881 A | 9/2014 |
| CN | 105128836 A | 12/2015 |
| TW | I509532 B | 11/2015 |
| TW | I540063 B | 7/2016 |

* cited by examiner

*Primary Examiner* — Timothy A Brainard
(74) *Attorney, Agent, or Firm* — Rosenberg, Klein & Lee

(57) ABSTRACT

An environment recognition system using vehicular millimeter wave radar includes a millimeter wave radar device detecting obstructions outside a vehicle and transforming detection results into reflection information. An energy intensity calculation device, an anti-noise calculation device, and an obstruction width calculation device are signally connected with the millimeter wave radar device to receive the reflection information, respectively calculate energy intensity information, signal-to-noise ratios and width information of the obstructions and transmit them to a control device. The control device integrates the energy intensity information, the signal-to-noise ratios and the width information to recognize types of the obstructions. The present invention can effectively recognize various obstructions outside the vehicle whereby the vehicle immediately reacts like performing a corresponding safety anti-collision system when detecting pedestrians.

12 Claims, 6 Drawing Sheets

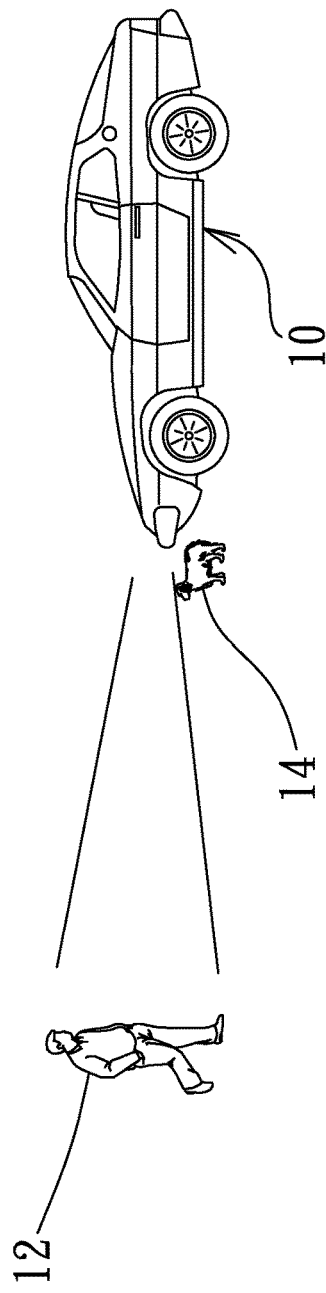
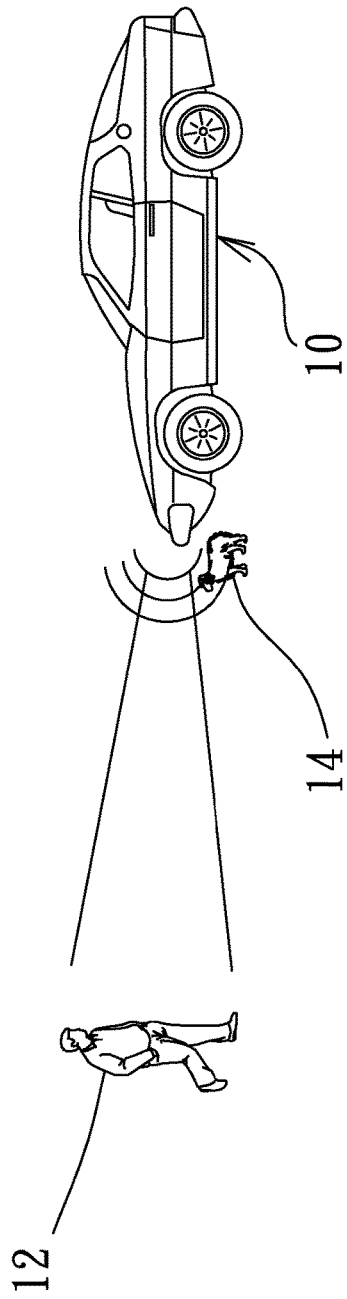
Fig. 1a (prior art)
Fig. 1b (prior art)

ENVIRONMENT RECOGNITION SYSTEM USING VEHICULAR MILLIMETER WAVE RADAR

BACKGROUND OF THE INVENTION

Field of the Invention

The present invention relates to a vehicular environment recognition system, particularly to an environment recognition system using vehicular millimeter wave radar, wherein the environment recognition system uses a millimeter wave radar to detect obstructions outside a vehicle, and uses application algorithms to calculate to recognize types of the obstructions.

Description of the Related Art

With the development of technology, many products required in daily life are greatly improved. Especially with the mature of semiconductor technology, vehicular electronic products are invented and developed, so as to improve the early vehicles driven by drivers. Thus, nowadays, vehicles have a function of moving and in addition to that many novel technologies apply to the vehicles, so as to further achieve safety protection for vehicles and drivers. The early technologies for an antitheft system and a car-reversing aid system and the present technology for obstruction and pedestrian recognition, panorama image detection outside vehicle, and automatic driving are helpful to driving safety.

Accordingly, drivers use the advanced vehicular electronic technology to achieve more safety and protection. However, the present recognition technology for obstructions or pedestrians is not easy to recognize pedestrians or the other obstructions. For example, refer to FIG. 1a. A vehicle 10 can use images to detect contour characteristics of a human body, so as to recognize a pedestrian 12. On account of a position of a camera on the vehicle 10 and a blind spot of a viewangle of the camera, the image recognition technology cannot detect obstruction images of short distance. For example, if a dog 14 is located in front of the vehicle 10, the dog 14 is easily neglected and collides with the vehicle 10 due to the blind spot of the viewangle. Then, refer to FIG. 1b. Radar detection of short distance is applied to the vehicle 10 to detect an obstruction of short distance such as the dog 14, lest a driver have a blind spot of a viewangle. With the improvement of radar detection technology, a radar recognition technology can recognize a width of an obstruction, thereby recognizing the obstruction as a pedestrian, a bicycle, a car or a truck. Refer to FIG. 1c. In general, the radar detection technology only uses the width of the obstruction to recognize. When the vehicle 10 is driven on a road, a street tree 16, a road lamp or a signal lamp is easily misjudged as a pedestrian 12. Alternatively, when the vehicle 10 simultaneously detects the pedestrian 12 and the street tree 16, a radar will misjudge due to the similar widths of the pedestrian 12 and the street tree 16. As soon as the technology applies to an automatic driving system or a safety anti-collision system, incorrect recognition easily occurs. When a collision is not averted in automatic driving and the vehicle 10 cannot recognize the pedestrian 12 or the street tree 16, the technology will not determine which one of the pedestrian 12 and the street tree 16 causes smaller damage value after the collision, whereby greater damage value occurs.

To overcome the abovementioned problems with recognizing general obstructions, the present invention provides an environment recognition system using vehicular millimeter wave radar, so as to effectively recognize obstructions such as pedestrians, street trees, road lamps or signal lamps.

SUMMARY OF THE INVENTION

A primary objective of the present invention is to provide an environment recognition system using vehicular millimeter wave radar, which utilizes calculation devices of different algorithms to effectively recognize various obstructions outside a vehicle, including those of pedestrians, street trees, or road lamps, etc., and which avoids misjudging street trees as pedestrians when performing a safety anti-collision system in driving, so as to incorrectly perform the safety anti-collision system and affect the safety of a driver and passengers, and which completely guarantee the safety of everyone in the vehicle.

Another objective of the present invention is to provide an environment recognition system using vehicular millimeter wave radar, which utilizes a millimeter wave radar to find various obstructions outside a vehicle in driving, so as to avoid colliding with the obstructions that are easily neglected by a naked eye while the vehicle moves. The easily-neglected obstruction may be located at a dead corner of driving sight or arranged closest to the vehicle body while the vehicle moves forward or backward. The millimeter wave radar is used to effectively recognize the obstructions of short distance, lest a driver carelessly collide with them.

To achieve the abovementioned objectives, the present invention provides an environment recognition system using vehicular millimeter wave radar, which comprises a millimeter wave radar device emitting a millimeter wave signal to an environment outside a vehicle to detect obstructions and transforming detection results of the millimeter wave signal into reflection information; an energy intensity calculation device signally connected with the millimeter wave radar device, receiving the reflection information, and retrieving a cross-section and power information detected by the millimeter wave radar device from the reflection information, so as to calculate energy intensity information of the obstructions; an anti-noise calculation device signally connected with the millimeter wave radar device, receiving the reflection information, and filtering out signals and noise of the reflection information to calculate signal-to-noise ratios of the obstructions; an obstruction width calculation device signally connected with the millimeter wave radar device, receiving the reflection information, and retrieving position information of the millimeter wave radar device and the obstructions from the reflection information, so as to calculate width information of the obstructions; and a control device signally connected with the energy intensity calculation device, the anti-noise calculation device and the obstruction width calculation device, receiving the energy intensity information, the signal-to-noise ratios and the width information, and integrating the energy intensity information, the signal-to-noise ratios and the width information to recognize types of the obstructions.

In the present invention, the millimeter wave radar device emits the millimeter wave signal to the environment outside the vehicle, and after the obstructions reflect the millimeter wave signal, the millimeter wave signal is transmitted back to the millimeter wave radar device, and the millimeter wave radar device transforms the reflected millimeter wave signal into the reflection information.

In the present invention, the energy intensity calculation device uses a radar cross-section and radar power information of the reflection information to calculate the energy intensity information of the obstructions. The anti-noise calculation device low-pass filters the reflection information to obtain a signal amplitude, high-pass filters the reflection information to obtain a noise amplitude, and uses the signal amplitude and the noise amplitude to calculate the signal-to-noise ratios of the obstructions. Finally, the obstruction width calculation device uses azimuth angles of the millimeter wave radar device and the obstruction of the reflection information to calculate a standard deviation of the azimuth angles, and uses the standard deviation of the azimuth angles to calculate the width information of the obstructions.

Finally, the present invention further comprises an image recognition device signally connected with the control device, and the control device uses the image recognition device to detect and display images of the obstructions in the environment outside the vehicle.

Below, the embodiments are described in detail in cooperation with the drawings to make easily understood the technical contents, characteristics and accomplishments of the present invention.

BRIEF DESCRIPTION OF THE DRAWINGS

FIGS. 1a-1c are diagrams schematically showing a vehicle recognizing obstructions in a conventional technology;

DETAILED DESCRIPTION OF THE INVENTION

With the rapid growth of vehicular electronic products, the present invention provides an environment recognition system using vehicular millimeter wave radar to overcome the drawbacks that the present vehicular radar cannot effectively recognize obstructions outside a vehicle, whereby an automatic driving system or a safety anti-collision system clearly and effectively recognize the obstruction outside the vehicle.

Figure 1C:
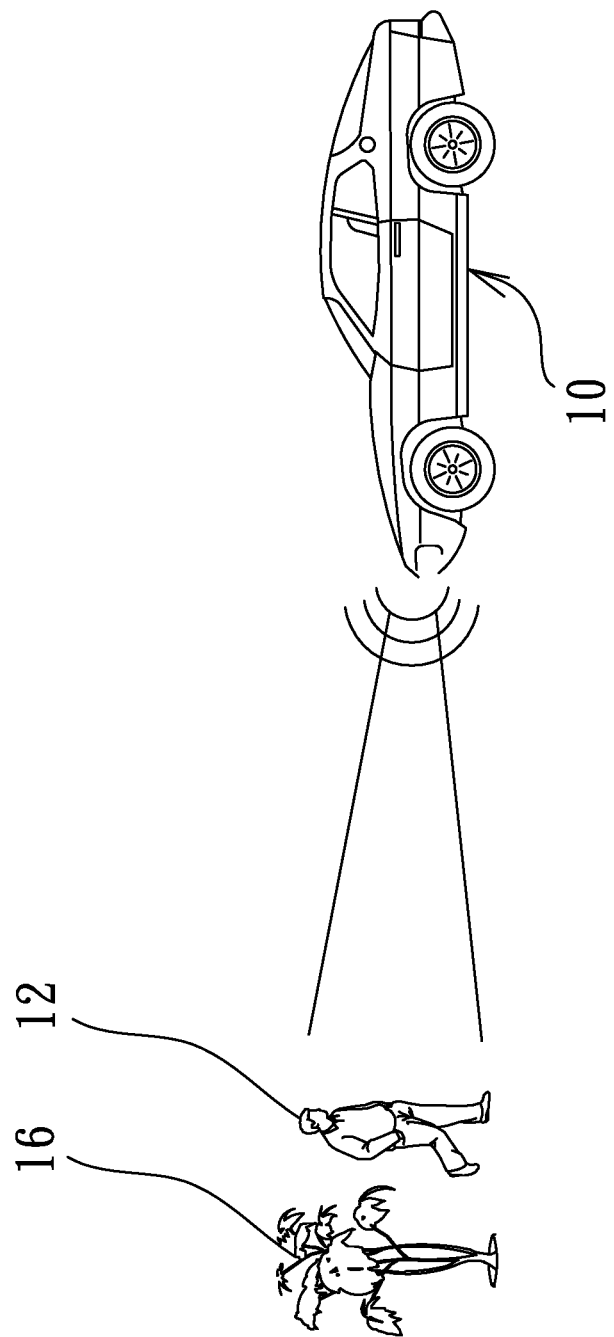
Figure 2:
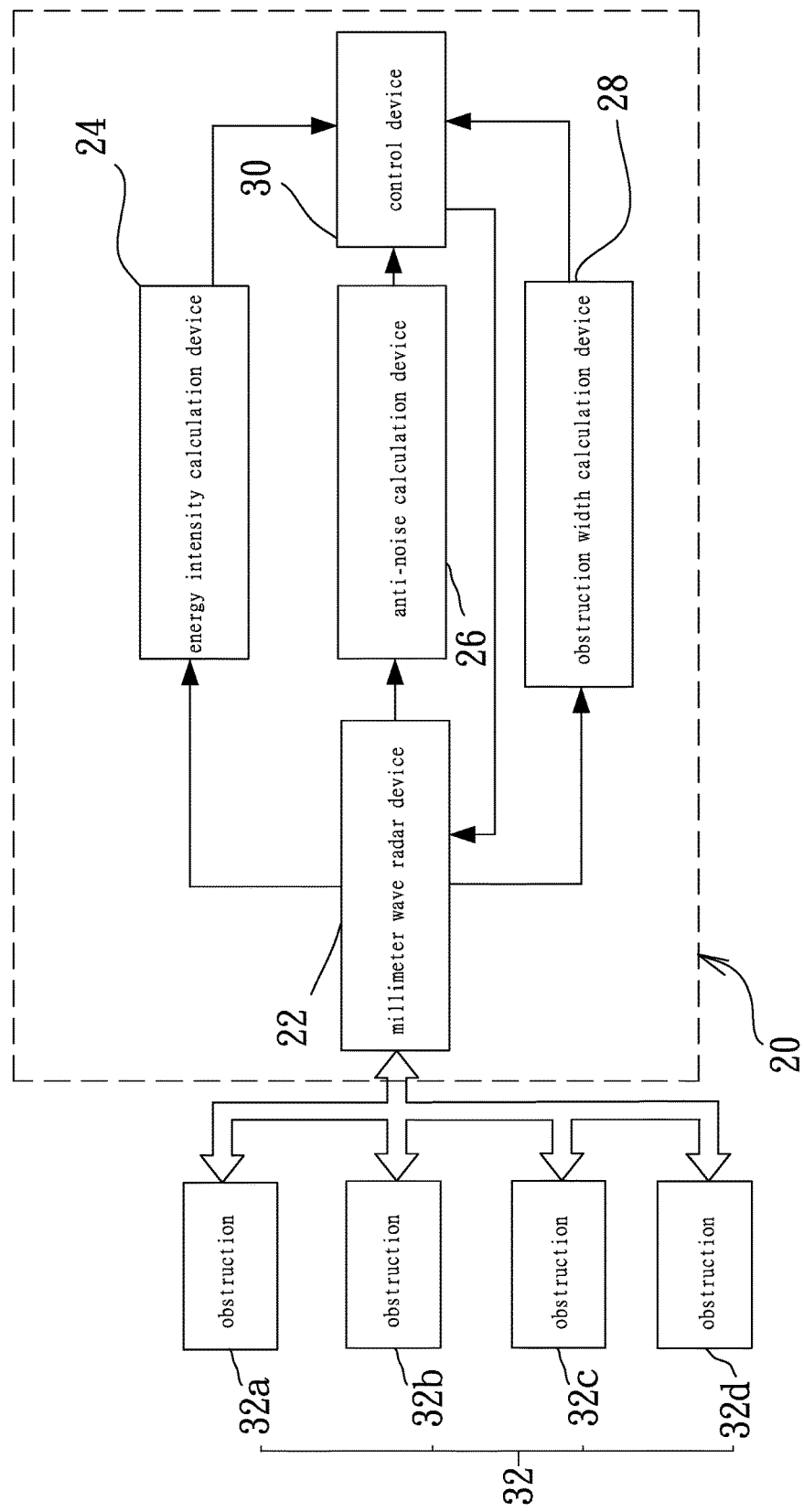
FIG. 2 is a block diagram schematically showing an environment recognition system using vehicular millimeter wave radar according to an embodiment of the present invention.

Firstly, refer to FIG. 2. An environment recognition system 20 using vehicular millimeter wave radar comprises a millimeter wave radar device 22, an energy intensity calculation device 24, an anti-noise calculation device 26, an obstruction width calculation device 28 and a control device 30. For example, the energy intensity calculation device 24 includes a processor and an energy intensity calculator. The anti-noise calculation device 26 includes a processor and an anti-noise calculator. The obstruction width calculation device 28 includes a processor and an obstruction width calculator. The control device 30 includes a processor and a controller. In the embodiment, the control device 30 is an electronic control unit (ECU). The millimeter wave radar device 22 has a processor and a millimeter wave radar that can emit a millimeter wave signal, wherein the processor is used to transform the millimeter wave signal. The millimeter wave radar device 22 is signally connected with the energy intensity calculation device 24, the anti-noise calculation device 26 and the obstruction width calculation device 28. The signal connection, for example, but not limited to wired signal connection or wireless signal connection, is used. The millimeter wave radar device 22, the energy intensity calculation device 24, the anti-noise calculation device 26 and the obstruction width calculation device 28 are signally connected with the control device 30.

Figure 3:
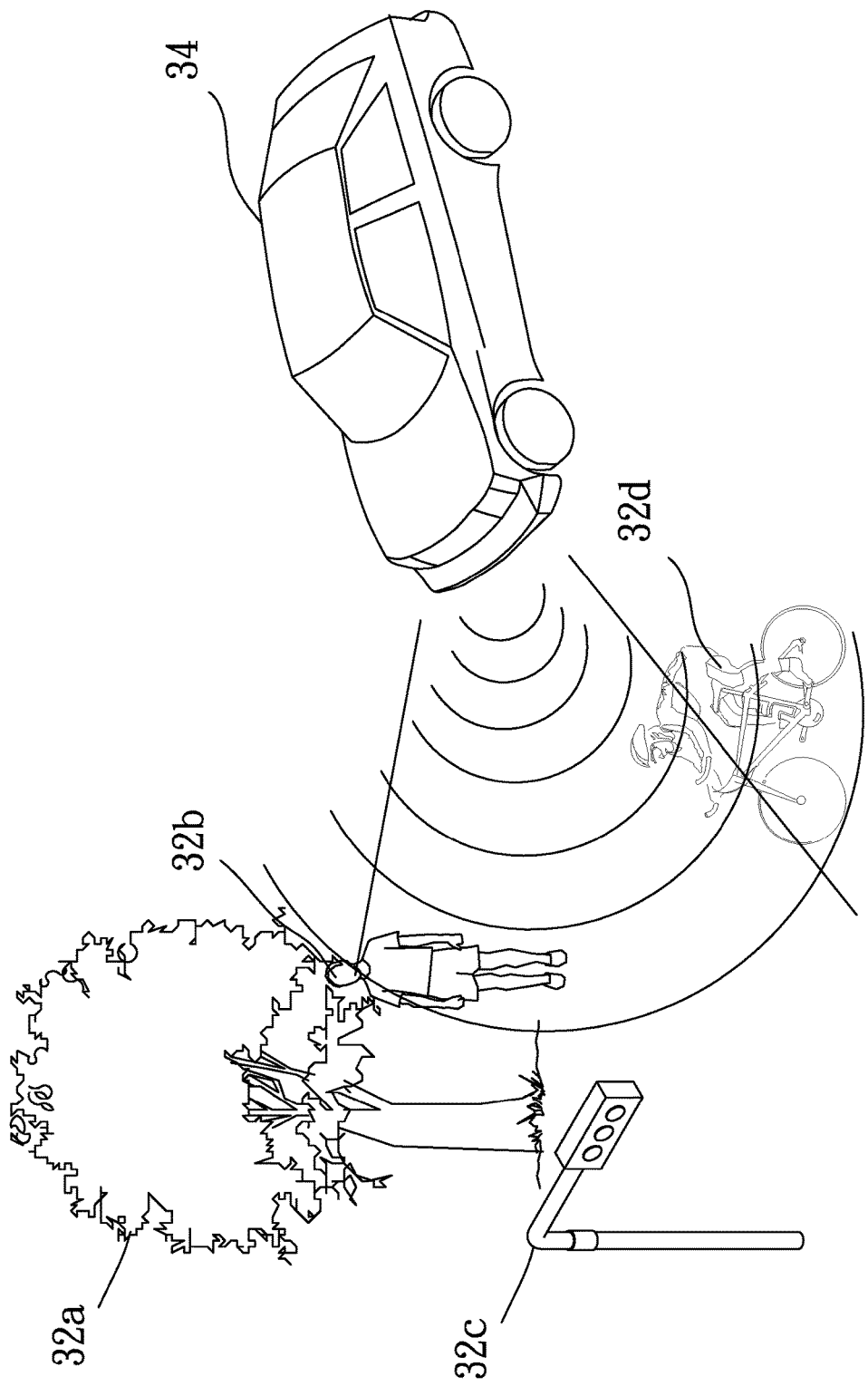
FIG. 3 is a diagram schematically showing a car recognizing obstructions according to an embodiment of the present invention.

Then, refer to FIG. 2 and FIG. 3. After describing the system of the present invention, the operation of the environment recognition system 20 using vehicular millimeter wave radar is described, so as to understand how the present invention effectively recognizes types of obstructions 32 outside a vehicle. The environment recognition system 20 using vehicular millimeter wave radar is installed in various vehicles. In the embodiment, the present invention exemplifies a car 34. In order to emit the millimeter wave signal to detect the obstructions in front of the car 34, the millimeter wave radar device 22 is usually installed at a front side of a body of the car 34, so as to emit the millimeter wave signal to the front of the car 34. Users or automobile manufacturers decide where to install the millimeter wave radar device 22 at the front side of the car 34 or other types of vehicles, but the present invention does not limit the installed position. Besides, in the embodiment, the millimeter wave radar device 22 is signally connected with the control device 30. The control device 30 starts the millimeter wave radar device 22 to emit the millimeter wave signal to exterior of the car 34, but the present invention is not limited thereto. The millimeter wave radar device 22 and the control device 30 may be signally connected with a vehicular host (not shown), and the vehicular host is used to control the millimeter wave radar device 22 and the control device 30. Alternatively, when the control device 30 itself is used as a vehicular host, the millimeter wave radar device 22 is signally connected with the control device 30, as described in the embodiment. In the embodiment, the obstructions 32 comprise four various obstructions 32a, 32b, 32c and 32d. The obstructions 32a, 32b and 32c are respectively a street tree, a pedestrian and a traffic light, and the obstruction 32d comprises a bicycle and a driver thereof. However, the present invention does not limit the amount and types of the obstructions 32. The millimeter wave radar device 22 can emit the millimeter wave signal to an environment outside of the car 34 to detect the obstructions 32. As the car 34 moves on, the obstructions 32a, 32b, 32c and 32d of different distances are sequentially detected, wherein the obstructions 32b and 32d may move. When the millimeter wave signal touches the obstructions 32a, 32b, 32c and 32d, a part of the millimeter wave signal is reflected back to the millimeter wave radar device 22. The millimeter wave radar device 22 transforms detection results of the reflected millimeter wave signal into reflection information. In the embodiment, the processor of the millimeter wave radar device 22 transforms the reflected millimeter wave signal into the reflection information using a Fast Fourier Transform (FFT).

Continuing from the abovementioned description, the millimeter wave radar device 22 transmits the reflection information to the energy intensity calculation device 24, the anti-noise calculation device 26, the obstruction width calculation device 28 after the reflection information is obtained. The energy intensity calculation device 24 receives the reflection information and retrieves a cross-section and power information of the millimeter wave radar device 22 from the reflection information, so as to calculate energy intensity information of the obstructions 32. The anti-noise calculation device 26 receives the reflection information, and filters out signals and noise of the reflection information to calculate signal-to-noise ratios of the obstructions 32. The obstruction width calculation device 28 receives the reflection information, and retrieves position information of the millimeter wave radar device 22 and the obstructions 32 from the reflection information, so as to calculate width information of the obstructions 32.

In order to further describe how the energy intensity calculation device 24, the anti-noise calculation device 26, the obstruction width calculation device 28 respectively calculate the energy intensity information, the signal-to-noise ratios and the width information, then calculation of the energy intensity calculation device 24, the anti-noise calculation device 26, the obstruction width calculation device 28 is detailed as below. The energy intensity calculation device 24 uses a radar cross-section (RCS) and radar power information of the transformed reflection information to calculate the energy intensity information of the obstructions 32. In the embodiment, the principle of using the RCS and radar power information to calculate the energy intensity information of the obstructions 32 is expressed by a formula (1):

$$Pr = \frac{PtGt}{4\pi r^2} \sigma \frac{1}{4\pi r^2} Aeff \frac{Gr\lambda^2}{4\pi} \qquad (1)$$

Wherein, Pr represents emitting power of the millimeter wave radar device 22 received by the energy intensity calculation device 24, and Pt represents emitting power of the millimeter wave radar device 22, and Gt represents an antenna gain of the millimeter wave radar device 22, and r represents a distance between the obstruction 32 and the millimeter wave radar device 22, and σ represents the radar cross-section corresponding to the obstruction 32, and Aeff represents an effective area of a receiving antenna, and Gr represents an antenna gain of a receiving terminal, and λ represents a wavelength, and π represents a ratio of a circumference of a circle to its diameter. In the embodiment, Due to different material of the obstructions 32a, 32b, 32c and 32d, such as a human body, a traffic light made of metal and a trunk of a street tree, they have energy intensity information in different energy ranges. Using parameter training of neural network, the energy intensity ranges of the different obstructions 32a, 32b, 32c and 32d are classified to recognize the different obstructions 32a, 32b, 32c and 32d. On account of a wide variety of the obstructions 32, the present invention does not limit the energy intensity information of the various obstructions 32.

Simultaneously, the anti-noise calculation device 26 low-pass filters the reflection information to obtain a signal amplitude, and high-pass filters the reflection information to obtain a noise amplitude. In the embodiment, the anti-noise calculation device 26 is further provided with a low-pass filter (not shown) and a high-pass filter (not shown) to respectively perform low-pass filtering and high-pass filtering. Then, the anti-noise calculation device 26 uses the signal amplitude and the noise amplitude to calculate the signal-to-noise ratios. The calculation of the signal-to-noise ratio is expressed by a formula (2):

$$SNR = 20\log_{10}\left(\frac{Aobj}{Anoise}\right) \qquad (2)$$

Wherein, SNR represents the signal-to-noise ratio, and Aobj represents the signal amplitude, and Anoise represents the noise amplitude. The signal-to-noise ratios are associated with the energy intensity information. There are different signal amplitudes and different signal noise amplitudes due to the different obstructions 32a, 32b, 32c and 32d. The signals and the noises reflected by the different obstructions 32a, 32b, 32c and 32d are respectively filtered to obtain the different signal amplitudes and noise amplitudes and calculate the signal-to-noise ratios. In addition, using parameter training of neural network, the different signal-to-noise ratios are also classified to know where the signal-to-noise ratios of the various obstructions 32a, 32b, 32c and 32d range. On account of a wide variety of the obstructions 32, the present invention does not limit the signal-to-noise ratios of the various obstructions 32.

The obstruction width calculation device 28 also uses azimuth angles of the millimeter wave radar device 22 and the obstructions 32 of the reflection information to calculate a standard deviation of the azimuth angles. The standard deviation of the azimuth angles belongs to analysis information of the same obstruction 32. In the embodiment, the width of the obstruction 32 is calculated by ±1 standard deviation of the azimuth angles. For the normal distribution, detection points of the obstructions 32 of 68.2% come from the same reflection body. Thus, the standard deviation of the azimuth angles is used to calculate the width information of the obstructions 32, and the calculation principle is expressed by formulas (3), (4) and (5):

$$\text{width} = -dis \times \sin(\theta - \sigma) + dis \times \sin(\theta + \sigma) \qquad (3)$$

$$\sigma = \sqrt{\frac{1}{n}\sum_{i=1}^{n}(\theta i - \overline{\theta})} \qquad (4)$$

$$\overline{\theta} = \frac{1}{n}\sum_{i=1}^{n}\theta i \qquad (5)$$

Wherein, width represents the width information of the obstruction 32, and dis represents a straight distance to the obstruction 32, and θ represents the azimuth angle, and $\overline{\theta}$ represents an average of the azimuth angles, and σ represents the standard deviation of the azimuth angles. The different obstructions 32a, 32b, 32c and 32d may have different width information. On account of a wide variety of the obstructions 32, the present invention does not limit the width information of the various obstructions 32.

Finally, the energy intensity calculation device 24, the anti-noise calculation device 26, the obstruction width calculation device 28 transmit the calculation results to the control device 30, and then the control device 30 integrates and analyzes the energy intensity information, the signal-to-noise ratios and the width information, so as to recognize types of the obstructions in front of the car 34. For example, a driver drives the car 34, the energy intensity information and the signal-to-noise ratios of the obstructions 32a, 32b, 32c and 32d in front of the car 34 are detected, so as to determine whether the obstructions 32a, 32b, 32c and 32d are human bodies, metal or plants and use the width information to determine the obstructions 32a, 32b, 32c and 32d.

Figure 4:
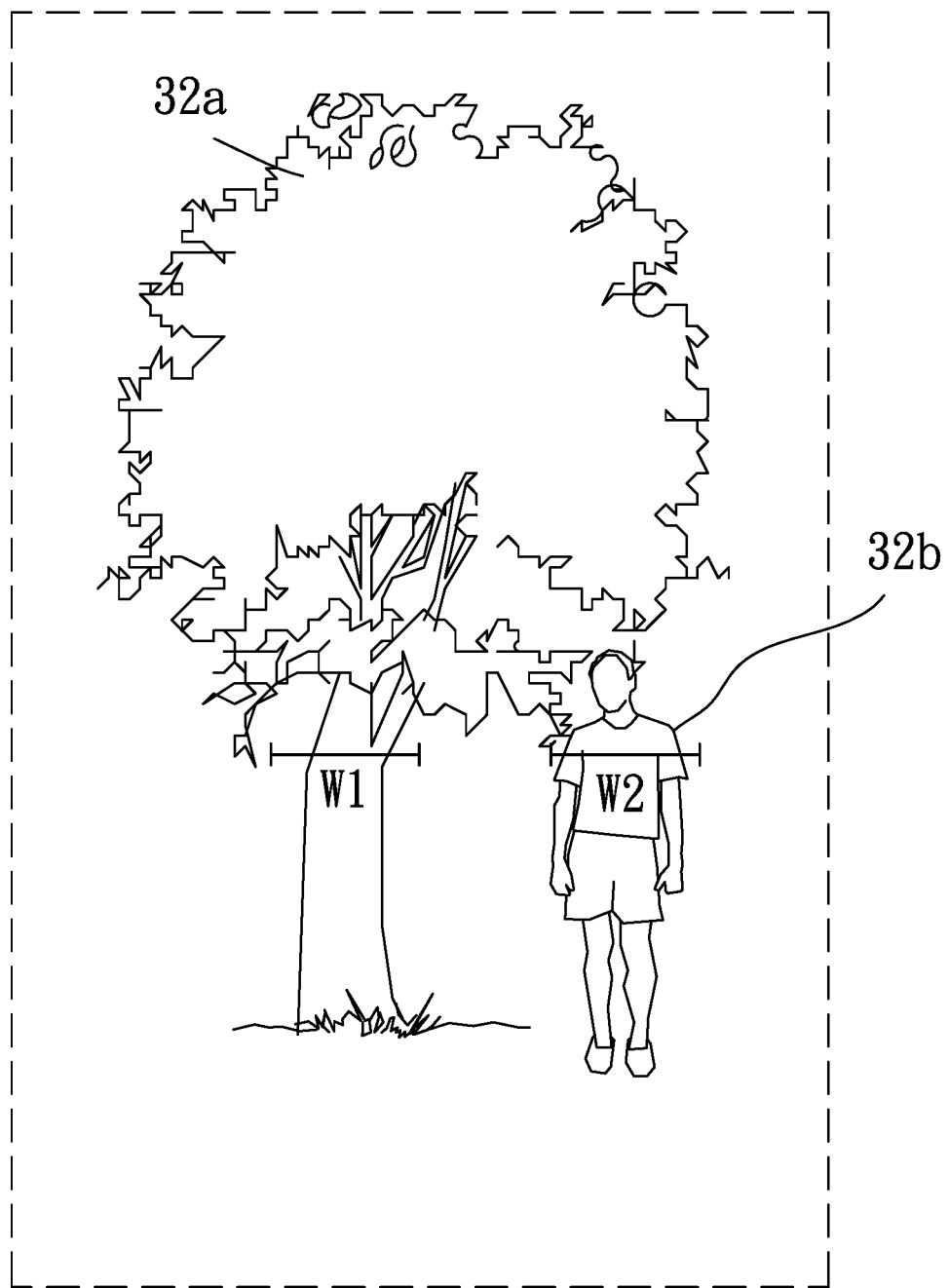
FIG. 4 is a diagram schematically recognizing widths of obstructions according to an embodiment of the present invention.

The present can effectively overcome the drawbacks of only using the radar to detect the width of obstruction in a conventional technology. Refer to FIG. 3 and FIG. 4. For example, when a pedestrian, a street tree and a metal traffic light respectively used as the obstructions 32a, 32b and 32c are located outside the car 34, the technology of only recognizing the width will confuse the obstructions 32a and 32b with similar width. For example, the width W1 of the obstruction 32a is similar to the width W2 of the obstruction 32b since the width of the pedestrian has a range of 1 m that may be similar to the width of the street tree. On top of that, a thin pedestrian is misjudged as a traffic light due to the fact that the width of a human body of the pedestrian is too narrow. As a result, the present invention can simultaneously compare the energy intensity information with the signal-to-noise ratios to recognize types of the obstructions with similar width, such as metal, plants or human bodies, and calculate their width to effectively recognize types of the obstructions.

Figure 5:
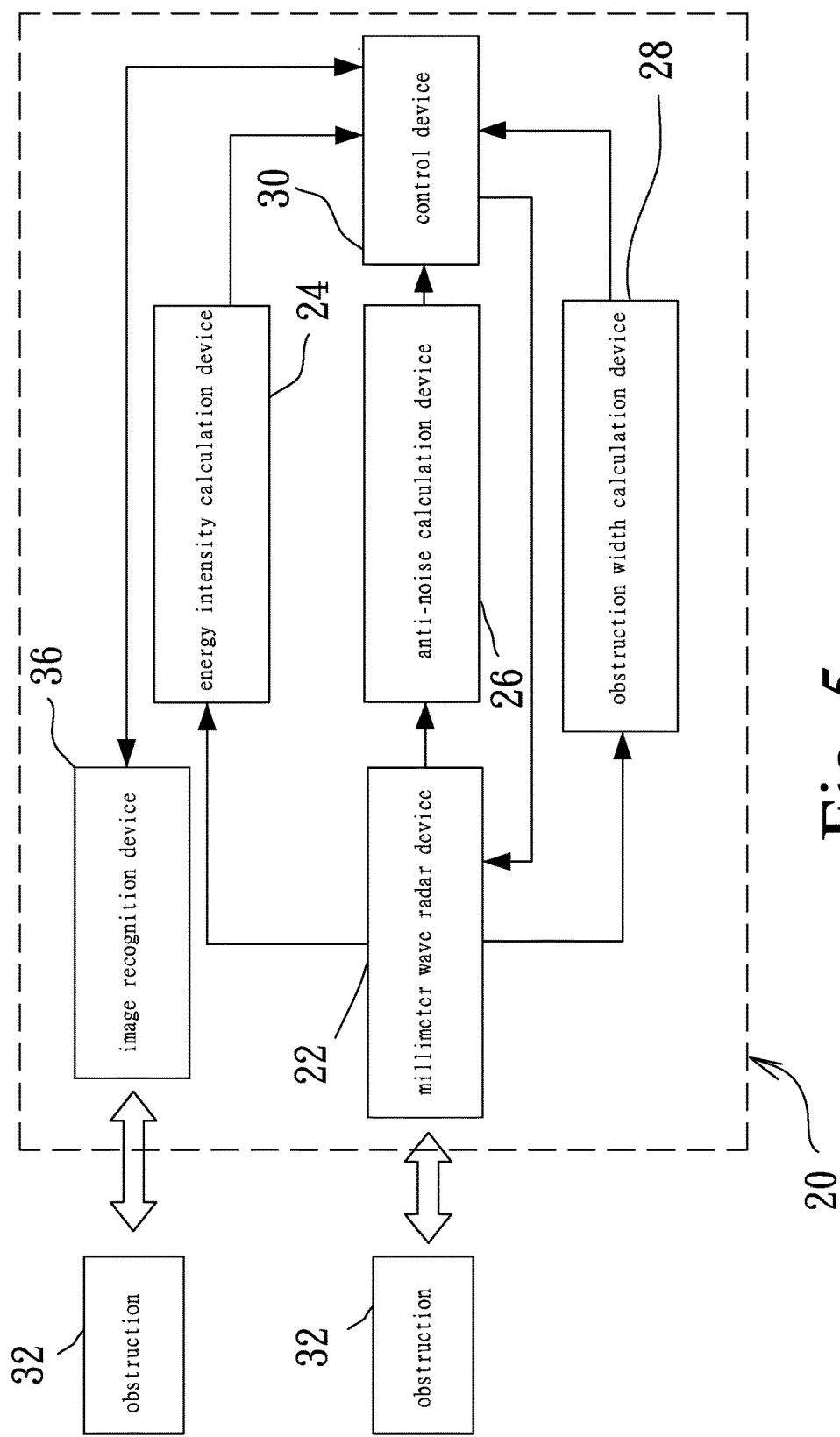
FIG. 5 is a block diagram schematically showing an environment recognition system using vehicular millimeter wave radar according to another embodiment of the present invention.

Furthermore, refer to FIG. 5. In addition to the millimeter wave radar device 22, the energy intensity calculation device 24, the anti-noise calculation device 26, the obstruction width calculation device 28 and the control device 30, the environment recognition system 20 using vehicular millimeter wave radar further comprises an image recognition device 36. In the embodiment, the image recognition device 36 is a vehicular camera or a vehicular display, but the present invention is not limited thereto. The image recognition device 36 is signally connected with the control device 30, whereby the environment recognition system 20 using vehicular millimeter wave radar not only uses the millimeter wave signal to detect the obstructions 32 but also uses the image recognition device 36 to detect the obstructions 32 in the environment outside a vehicle, and whereby the image recognition device 36 displays images of the obstructions 32. Thus, the driver can clearly see the obstructions 32 observed by a naked eye through the screen.

The present invention mainly uses three different recognition ways, namely the energy intensity information, the signal-to-noise ratios and the width information, thereby improving to recognize types of the obstructions. The present invention does not limit the recognition steps, but describes the recognition steps for special requirement. For example, the energy intensity information and the signal-to-noise ratio are recognized, and then the width of the obstruction is recognized to determine whether the obstruction is a pedestrian. Alternatively, the other recognition process is also performed. The types of the obstructions described above are only to exemplify the embodiment but not to limit the scope of the present invention. The obstructions are also street lamps or various objects observed on a road. In addition to detecting the obstructions easily neglected by a naked eye, the present invention can precisely recognize different types of the obstructions. For example, the present invention can more easily determine whether the obstruction is a pedestrian, so as to help an automatic driving system or a safety anti-collision system react, and when the collision is unavoidable, the automatic driving system or the safety anti-collision system can determine which obstructions will minimize the damage value of the overall collision.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An environment recognition system using vehicular millimeter wave radar comprising:
   a millimeter wave radar device emitting a millimeter wave signal to an environment outside a vehicle to detect obstructions and transforming detection results of said millimeter wave signal into reflection information;
   an energy intensity calculation device signally connected with said millimeter wave radar device, receiving said reflection information, and retrieving a cross-section and power information detected by said millimeter wave radar device from said reflection information, so as to calculate energy intensity information of said obstructions;
   an anti-noise calculation device signally connected with said millimeter wave radar device, receiving said reflection information, and filtering out signals and noise of said reflection information to calculate signal-to-noise ratios of said obstructions;
   an obstruction width calculation device signally connected with said millimeter wave radar device, receiving said reflection information, and retrieving position information of said millimeter wave radar device and said obstructions from said reflection information, so as to calculate width information of said obstructions; and
   a control device signally connected with said energy intensity calculation device, said anti-noise calculation device and said obstruction width calculation device, receiving said energy intensity information, said signal-to-noise ratios and said width information, and integrating said energy intensity information, said signal-to-noise ratios and said width information to recognize types of said obstructions.

2. The environment recognition system using vehicular millimeter wave radar according to claim 1, wherein said millimeter wave radar device emits said millimeter wave signal to said environment outside said vehicle, and after said obstructions reflect said millimeter wave signal, said millimeter wave signal is transmitted back to said millimeter wave radar device, and said millimeter wave radar device transforms reflected said millimeter wave signal into said reflection information.

3. The environment recognition system using vehicular millimeter wave radar according to claim 2, wherein said millimeter wave radar device transforms reflected said millimeter wave signal into said reflection information using a Fast Fourier Transform (FFT).

4. The environment recognition system using vehicular millimeter wave radar according to claim 1, wherein said control device is an electronic control unit (ECU).

5. The environment recognition system using vehicular millimeter wave radar according to claim 1, wherein said obstructions comprise pedestrians, street trees, vehicles, road lamps or signal poles.

6. The environment recognition system using vehicular millimeter wave radar according to claim 1, wherein said energy intensity calculation device uses a radar cross-section and radar power information of said reflection information to calculate said energy intensity information of said obstructions.

7. The environment recognition system using vehicular millimeter wave radar according to claim 6, wherein said energy intensity information is expressed by $$Pr = \frac{PtGt}{4\pi r^2} \sigma \frac{1}{4\pi r^2} Aeff \frac{Gr\lambda^2}{4\pi},$$

and Pr represents emitting power of said millimeter wave radar device received by said energy intensity calculation device, and Pt represents emitting power of said millimeter wave radar device, and Gt represents an antenna gain of said millimeter wave radar device, and r represents a distance between said obstruction and said millimeter wave radar device, and σ represents said radar cross-section corresponding to said obstruction, and Aeff represents an effective area of a receiving antenna, and Gr represents an antenna gain of a receiving terminal, and λ represents a wavelength, and π represents a ratio of a circumference of a circle to its diameter.

8. The environment recognition system using vehicular millimeter wave radar according to claim 1, wherein said anti-noise calculation device low-pass filters said reflection information to obtain a signal amplitude, high-pass filters said reflection information to obtain a noise amplitude, and uses said signal amplitude and said noise amplitude to calculate said signal-to-noise ratios of said obstructions.

9. The environment recognition system using vehicular millimeter wave radar according to claim 8, wherein said signal-to-noise ratio is expressed by $$SNR = 20\log_{10}\left(\frac{Aobj}{Anoise}\right),$$

and SNR represents said signal-to-noise ratio, and Aobj represents said signal amplitude, and Anoise represents said noise amplitude.

10. The environment recognition system using vehicular millimeter wave radar according to claim 1, wherein said obstruction width calculation device uses azimuth angles of said millimeter wave radar device and said obstruction of said reflection information to calculate a standard deviation of said azimuth angles, and uses said standard deviation of said azimuth angles to calculate said width information of said obstructions.

11. The environment recognition system using vehicular millimeter wave radar according to claim 10, wherein said width information is expressed by width=dis×sin(θ−σ)+dis×sin(θ+σ), $$\sigma = \sqrt{\frac{1}{n}\sum_{i=1}^{n}(\theta i - \overline{\theta})} \text{ and } \overline{\theta} = \frac{1}{n}\sum_{i=1}^{n}\theta i,$$

and width represents said width information, and dis represents a straight distance to said obstruction, and θ represents said azimuth angle, and n represents a number of sampling points used and $\overline{\theta}$ represents an average of said azimuth angles, and σ represents said standard deviation of said azimuth angles.

12. The environment recognition system using vehicular millimeter wave radar according to claim 1, further comprising an image recognition device signally connected with said control device, and said control device uses said image recognition device to detect and display images of said obstructions in said environment outside said vehicle.

\* \* \* \* \*